(12) United States Patent
Asakawa et al.

(10) Patent No.: US 10,465,550 B2
(45) Date of Patent: Nov. 5, 2019

(54) VARIABLE GEOMETRY TURBOCHARGER

(71) Applicant: IHI Corporation, Koto-ku (JP)

(72) Inventors: Takao Asakawa, Koto-ku (JP); Kenichi Segawa, Koto-ku (JP); Takahiro Kobayashi, Koto-ku (JP); Ryota Sakisaka, Koto-ku (JP); Kazuko Takeuchi, Koto-ku (JP); Kenji Bunno, Koto-ku (JP)

(73) Assignee: IHI Corporation, Koto-ku (JP)

( * ) Notice: Subject to any disclaimer, the term of this patent is extended or adjusted under 35 U.S.C. 154(b) by 137 days.

(21) Appl. No.: 15/577,366

(22) PCT Filed: May 27, 2016

(86) PCT No.: PCT/JP2016/065797
§ 371 (c)(1),
(2) Date: Nov. 28, 2017

(87) PCT Pub. No.: WO2016/199600
PCT Pub. Date: Dec. 15, 2016

(65) Prior Publication Data
US 2018/0156061 A1 Jun. 7, 2018

(30) Foreign Application Priority Data
Jun. 9, 2015 (JP) .................. 2015-116469

(51) Int. Cl.
*F01D 17/16* (2006.01)
*F02B 37/24* (2006.01)
*F02C 6/12* (2006.01)

(52) U.S. Cl.
CPC .......... *F01D 17/165* (2013.01); *F01D 17/16* (2013.01); *F02B 37/24* (2013.01); *F02C 6/12* (2013.01);
(Continued)

(58) Field of Classification Search
CPC .......... F01D 17/165; F01D 17/16; F02C 6/12; F02B 37/24; F05D 2260/50; F05D 2250/90; F05D 2240/128; F05D 2220/40
See application file for complete search history.

(56) References Cited

U.S. PATENT DOCUMENTS 7,509,804 B2 * 3/2009 Kobayashi ............ F01D 17/165
415/158
9,739,165 B2 * 8/2017 Uesugi .................. F01D 17/165
(Continued)

FOREIGN PATENT DOCUMENTS

CN 101668933 A 3/2010
CN 104018936 A 9/2014
(Continued)

OTHER PUBLICATIONS

International Search Report dated Aug. 16, 2016 in PCT/JP2016/065797 filed May 27, 2016.

*Primary Examiner* — Justin D Seabe
*Assistant Examiner* — Adam W Brown
(74) *Attorney, Agent, or Firm* — Oblon, McClelland, Maier & Neustadt, L.L.P.

(57) ABSTRACT

A variable geometry turbocharger includes a turbine having a variable nozzle unit, and a compressor. The variable nozzle unit has: a unit main body part that is fixed to a turbine housing and rotatably supports a plurality of nozzle vanes; a drive ring that transmits a driving force to the plurality of nozzle vanes; and a drive ring support member that is fixed to the unit main body part and rotatably supports the drive ring. The drive ring support member is formed by one member and has: base end side parts that regulate movement of the drive ring in a radial direction; tip end side parts that regulate movement of the drive ring to the compressor side; and turbine side receiving parts that regulate movement of
(Continued)

the drive ring to the turbine side in the direction of a rotational axis.

2 Claims, 5 Drawing Sheets

(52) U.S. Cl.
CPC .... *F05D 2220/40* (2013.01); *F05D 2240/128* (2013.01); *F05D 2250/90* (2013.01); *F05D 2260/50* (2013.01)

(56) References Cited

U.S. PATENT DOCUMENTS

| | | | |
|---|---|---|---|
| 2004/0213665 A1 | 10/2004 | Ohishi et al. | |
| 2005/0252210 A1 | 11/2005 | Shiraishi et al. | |
| 2009/0092483 A1* | 4/2009 | Yasui | F01D 17/165 |
| | | | 415/159 |
| 2009/0145523 A1 | 6/2009 | Ohishi et al. | |
| 2010/0124489 A1 | 5/2010 | Suzuki et al. | |
| 2011/0308084 A1 | 12/2011 | Ohishi et al. | |
| 2012/0082539 A1 | 4/2012 | Mohiki | |
| 2014/0248135 A1* | 9/2014 | Inoue | F01D 17/14 |
| | | | 415/150 |
| 2014/0248137 A1 | 9/2014 | Inoue et al. | |

FOREIGN PATENT DOCUMENTS

| | | |
|---|---|---|
| JP | 3-92502 U | 9/1991 |
| JP | 2002-332862 A | 11/2002 |
| JP | 2006-514191 A | 4/2006 |
| JP | 2006-125588 A | 5/2006 |
| JP | 2009-74492 A | 4/2009 |
| JP | 2009-180111 A | 8/2009 |
| JP | 2010-229908 A | 10/2010 |
| JP | 2011-85054 A | 4/2011 |
| JP | 2011-117320 A | 6/2011 |
| JP | 2014-169641 A | 9/2014 |
| JP | 2014-169642 A | 9/2014 |

\* cited by examiner

Fig.5
(a)
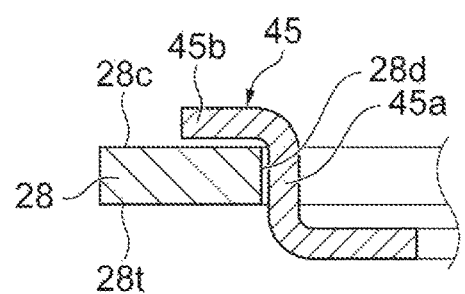
(b)
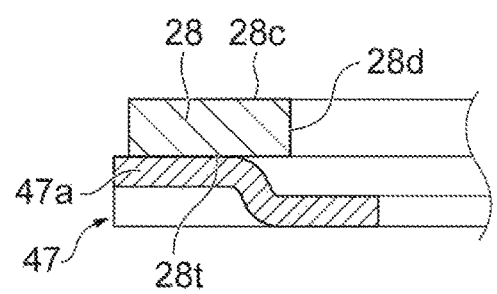
(c)
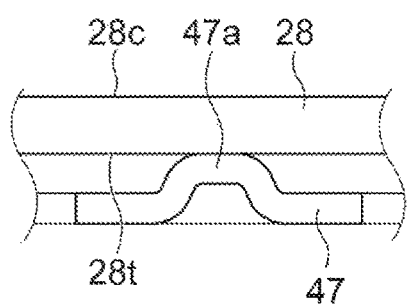

VARIABLE GEOMETRY TURBOCHARGER

TECHNICAL FIELD

The present disclosure relates to a variable geometry turbocharger.

BACKGROUND ART

The variable geometry turbocharger described in Patent Literature 1 below has been known as technology in this field. The variable geometry turbocharger is equipped with a nozzle driving mechanism for driving a nozzle of a turbine. In the nozzle driving mechanism, a plurality of roller pins are arranged in a circumferential direction, and are fixed to a nozzle mount. Rotatable rollers are mounted on the respective roller pins, and each of the rollers abuts an inner circumferential edge of a drive ring. The drive ring is a member for transmitting a driving force to the nozzle, and is supported by the plurality of rollers.

CITATION LIST

Patent Literature

[Patent Literature 1] Japanese Unexamined Patent Publication No. 2006-514191

SUMMARY OF INVENTION

Technical Problem

However, in the variable geometry turbocharger, the drive ring is supported by a group of relatively complicated components such that the plurality of roller pins and the plurality of rollers are installed on the nozzle mount. In this type of variable geometry turbocharger, from the viewpoint of reducing manufacturing costs, it is desired to simplify a structure of the driving mechanism for driving the nozzle to improve manufacturability.

The present disclosure is to describe a variable geometry turbocharger in which a structure of a mechanism for driving a nozzle is simplified to improve manufacturability.

Solution to Problem

A variable geometry turbocharger according to an aspect of the present disclosure includes: a turbine having a turbine impeller, a turbine housing configured to form a scroll flow passage disposed around the turbine impeller, and a variable nozzle unit including a plurality of movable nozzle vanes disposed around the turbine impeller in a gas inflow passage from the scroll flow passage to the turbine impeller; and a compressor connected to the turbine impeller via a rotary shaft and having a compressor impeller rotating around the same rotational axis as the turbine impeller. The variable nozzle unit has a unit main body part that is held on the turbine housing and rotatably supports the plurality of nozzle vanes, a drive ring that is rotated around the rotational axis relative to the unit main body part and transmits a driving force to the plurality of nozzle vanes, and a ring support member that is fixed to the unit main body part and rotatably supports the drive ring. The ring support member is formed by one member, and has radial regulating parts that regulate movement of the drive ring in a radial direction, compressor side regulating parts that regulate movement of the drive ring to the compressor side in a direction of the rotational axis, and turbine side regulating parts that regulate movement of the drive ring to the turbine side in the direction of the rotational axis.

Effects of Invention

According to the variable geometry turbocharger of the present disclosure, a structure of a mechanism for driving a nozzle can be simplified to improve manufacturability.

BRIEF DESCRIPTION OF DRAWINGS

FIG. 5(a) is a sectional view of a hook parts in FIG. 4, FIG. 5(b) is a sectional view including a protrusion part, and FIG. 5(c) is a view illustrating the vicinity of a protrusion when viewed from the outside in a radial direction.

DESCRIPTION OF EMBODIMENTS

Figure 1:
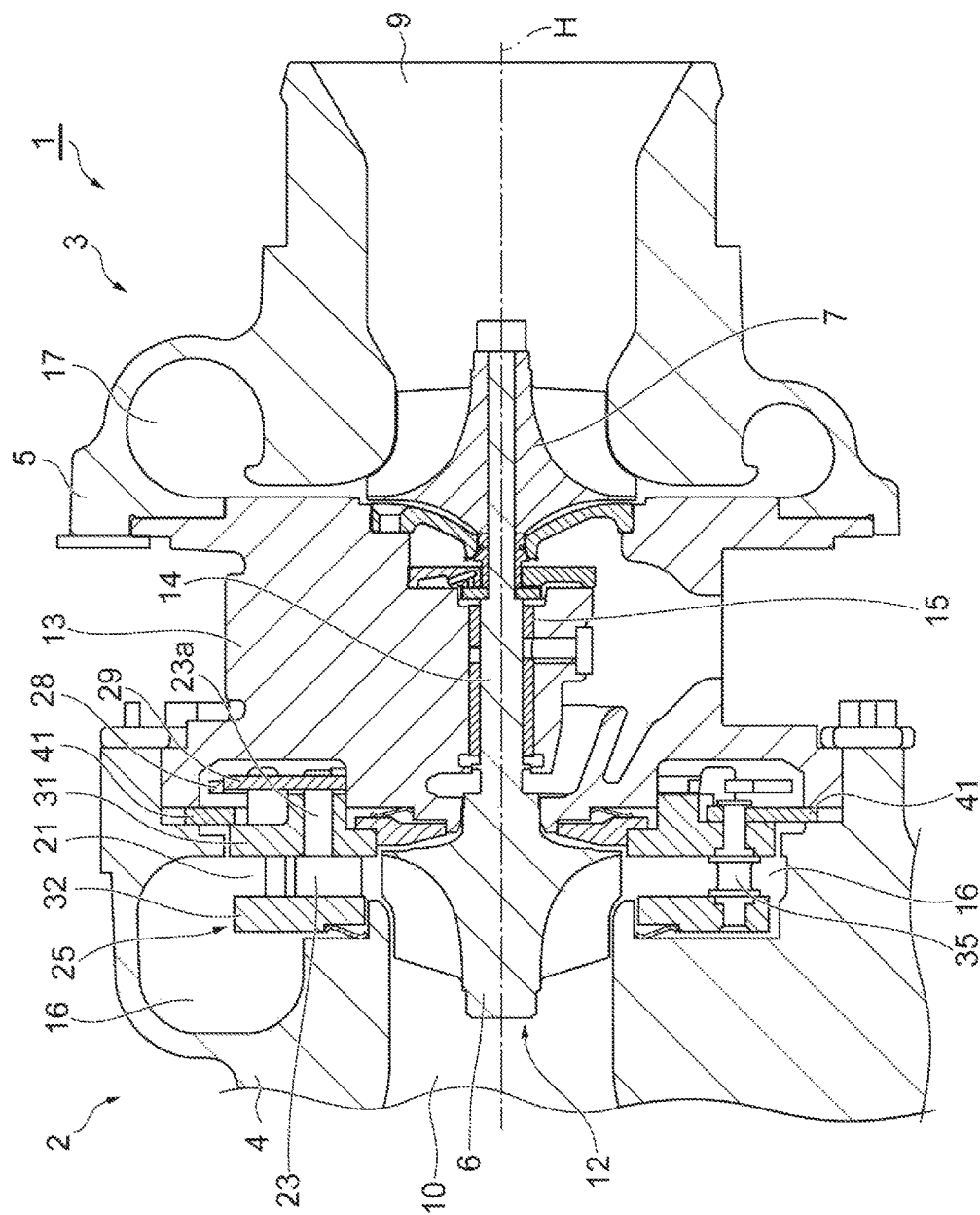
FIG. 1 is a sectional view of a variable geometry turbocharger according to an embodiment.

A variable geometry turbocharger according to an aspect of the present disclosure includes: a turbine having a turbine impeller, a turbine housing configured to form a scroll flow passage disposed around the turbine impeller, and a variable nozzle unit including a plurality of movable nozzle vanes disposed around the turbine impeller in a gas inflow passage from the scroll flow passage to the turbine impeller; and a compressor connected to the turbine impeller via a rotary shaft and having a compressor impeller rotating around the same rotational axis as the turbine impeller. The variable nozzle unit has a unit main body part that is held on the turbine housing and rotatably supports the plurality of nozzle vanes, a drive ring that is rotated around the rotational axis relative to the unit main body part and transmits a driving force to the plurality of nozzle vanes, and a ring support member that is fixed to the unit main body part and rotatably supports the drive ring. The ring support member is formed by one member, and has radial regulating parts that regulate movement of the drive ring in a radial direction, compressor side regulating parts that regulate movement of the drive ring to the compressor side in a direction of the rotational axis, and turbine side regulating parts that regulate movement of the drive ring to the turbine side in the direction of the rotational axis.

In the variable nozzle unit of the variable geometry turbocharger, the drive ring is supported by the ring support member formed by one member, and the movement of the drive ring in the radial direction, to the compressor side, and to the turbine side is regulated. In this way, the functions of the movement regulation in the radial direction, the movement regulation to the compressor side, and the movement regulation to the turbine side required to support the drive ring are realized by one member. Therefore, a structure of the variable nozzle unit can be simplified to improve manufacturability can be improved.

As a specific constitution, the ring support member may include a plurality of hook parts that are arranged on a circumference whose center is the rotational axis and are engaged with an edge of an inner circumferential side of the drive ring, and each of the hook parts may have the radial regulating part located inside in a radial direction relative to the edge of the inner circumferential side of the drive ring, and the compressor side regulating part that extends outward from the radial regulating part in the radial direction and faces an end face of the drive ring at the compressor side.

Further, the turbine side regulating parts may have a plurality of protrusion parts that are arranged on the circumference whose center is the rotational axis and protrude to the compressor side to face an end face of the drive ring at the turbine side.

In addition, the hook parts and the turbine side regulating parts may be provided at positions different from each other in a circumferential direction.

Hereinafter, embodiments of the variable geometry turbocharger of the present disclosure will be described with reference to the drawings. Note that, in the drawings, features of components may be exaggerated, and the dimensional ratios between regions in the drawings do not necessarily correspond to the actual ratios.

A variable geometry turbocharger 1 illustrated in FIG. 1 is applied to, for instance, an internal combustion engine of a ship or a vehicle. As illustrated in FIG. 1, the variable geometry turbocharger 1 is provided with a turbine 2 and a compressor 3. The turbine 2 is provided with a turbine housing 4 and a turbine impeller 6 that is housed in the turbine housing 4. The turbine housing 4 has a scroll flow passage 16 that extends in a circumferential direction around the turbine impeller 6. The compressor 3 is provided with a compressor housing 5 and a compressor impeller 7 that is housed in the compressor housing 5. The compressor housing 5 has a scroll flow passage 17 that extends in a circumferential direction around the compressor impeller 7.

The turbine impeller 6 is provided at one end of a rotary shaft 14, and the compressor impeller 7 is provided at the other end of the rotary shaft 14. A bearing housing 13 is provided between the turbine housing 4 and the compressor housing 5. The rotary shaft 14 is rotatably supported by the bearing housing 13 via a bearing 15, and the rotary shaft 14, the turbine impeller 6, and the compressor impeller 7 are rotated around a rotational axis H as an integrated rotor 12.

An exhaust gas inlet (not shown) and an exhaust gas outlet 10 are provided in the turbine housing 4. An exhaust gas exhausted from the internal combustion engine (not shown) flows into the turbine housing 4 through the exhaust gas inlet. Then, the exhaust gas flows into the turbine impeller 6 through the scroll flow passage 16, and rotates the turbine impeller 6. Afterward, the exhaust gas flows out of the turbine housing 4 through the exhaust gas outlet 10.

An intake port 9 and a discharge port (not shown) are provided in the compressor housing 5. When the turbine impeller 6 is rotated as described above, the compressor impeller 7 is rotated via the rotary shaft 14. The rotated compressor impeller 7 suctions outside air through the intake port 9, compresses this air, and discharges the compressed air from the discharge port through the scroll flow passage 17. The compressed air discharged from the discharge port is supplied to the aforementioned internal combustion engine.

Subsequently, the turbine 2 will be described in greater detail. The turbine 2 is a variable geometry turbine. Movable nozzle vanes 23 are provided in a gas inflow passage 21 that connects the scroll flow passage 16 and the turbine impeller 6. The plurality of nozzle vanes 23 are arranged on the circumference of a circle whose center is the rotational axis H. Each of the nozzle vanes 23 rotates around an axis parallel to the rotational axis H. The nozzle vanes 23 rotate as described above, and thereby a cross-sectional area of a gas flow passage is optimally adjusted depending on a flow rate of the exhaust gas introduced into the turbine 2. As a driving mechanism which rotates the nozzle vanes 23 as described above, the turbine 2 includes a variable nozzle unit 25. The variable nozzle unit 25 is fitted inside the turbine housing 4, and is held and fixed by the turbine housing 4 and the bearing housing 13.

Figure 2:
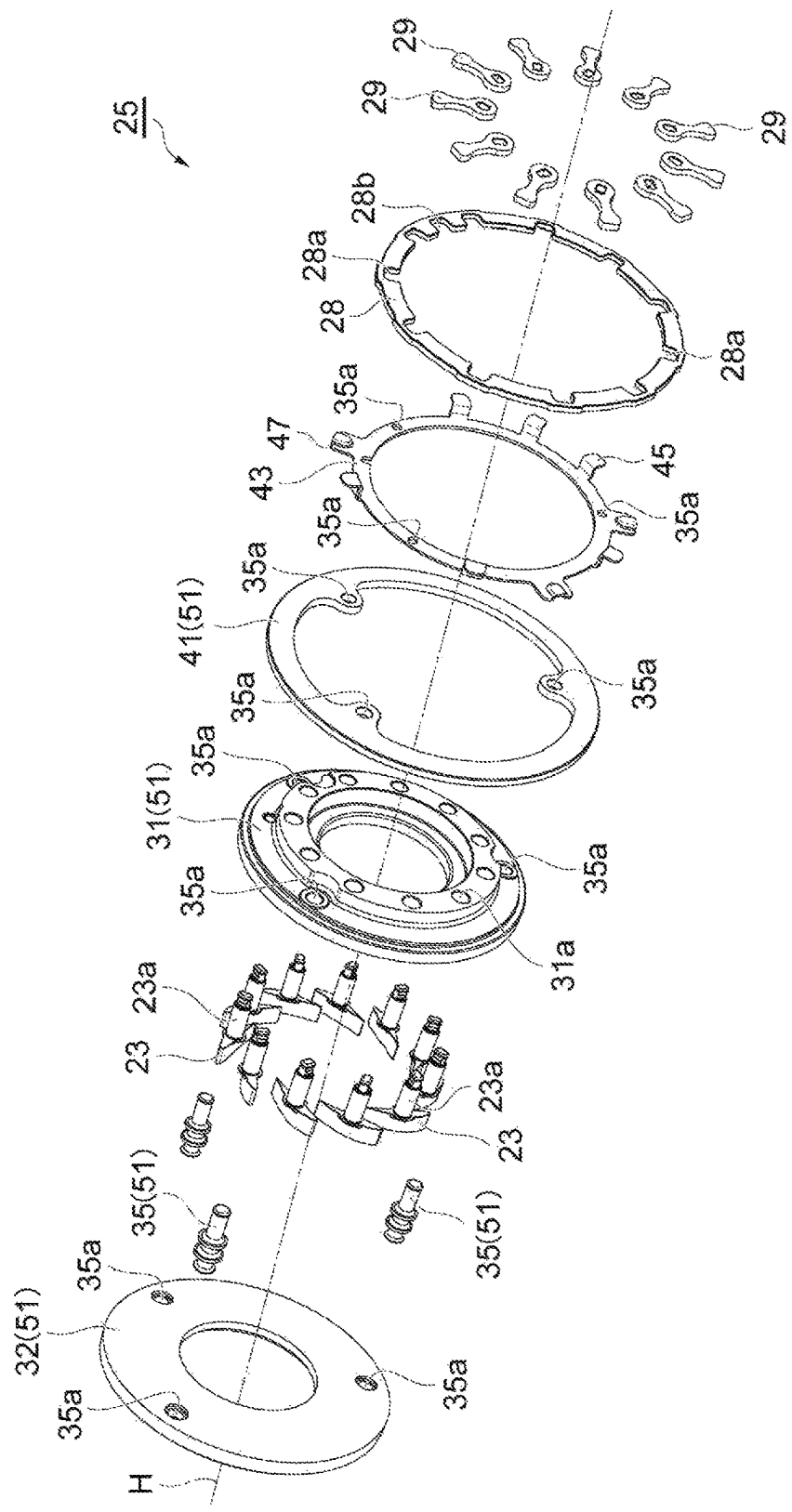
FIG. 2 is an exploded perspective view of a variable nozzle unit.

The variable nozzle unit 25 will be described below in greater detail with reference to FIGS. 1 and 2. In the following description, when "an axial direction," "a radial direction," and "a circumferential direction" are simply mentioned, they refer to a direction of a rotational axis H of the turbine impeller 6, a radial direction of rotation thereof, and a circumferential direction of rotation thereof. In addition, "upstream" and "downstream" denote upstream and downstream in the exhaust gas in the scroll flow passage 16. In the direction of the rotational axis H, a side (a left side in FIG. 2) adjacent to the turbine 2 may be referred to simply as "turbine side," and a side (a right side in FIG. 2) adjacent to the compressor 3 may be referred to simply as "compressor side."

The variable nozzle unit 25 has the plurality of nozzle vanes 23 (in the example of the figure, eleven nozzle vanes 23), a first nozzle ring 31, and a second nozzle ring 32. The first nozzle ring 31 and the second nozzle ring 32 are located across the nozzle vanes 23 in the axial direction. Each of the first nozzle ring 31 and the second nozzle ring 32 has a ring shape whose center is the rotational axis H, and is arranged to surround the turbine impeller 6 in the circumferential direction. A region sandwiched between the first nozzle ring 31 and the second nozzle ring 32 constitutes the aforementioned gas inflow passage 21. The second nozzle ring 32 faces the scroll flow passage 16 (see FIG. 1), and the second nozzle ring 32 forms a part of an inner wall of the scroll flow passage 16. A rotating shaft 23a of each of the nozzle vanes 23 is rotatably inserted into a bearing hole 31a of the first nozzle ring 31. The first nozzle ring 31 journals each of the nozzle vanes 23 in a cantilever form. In the example of the figure, the nozzle vanes 23 are arranged on a circumference at regular intervals, but arranging the nozzle vanes 23 at regular intervals is not essential.

An annular plate-like support ring 41 is fixed at the compressor side of the first nozzle ring 31, and further a drive ring support member 43 having a ring shape is fixed at the compressor side of the support ring 41. Each of the first nozzle ring 31, the second nozzle ring 32, the support ring 41, and the drive ring support member 43 is provided with a plurality of (in the example of the figure, three) pin holes 35a. Connecting pins 35 are inserted into the respective pin holes 35a, and thereby the first nozzle ring 31, the second nozzle ring 32, the support ring 41, and the drive ring support member 43 are connected mutually.

The support ring 41 and the drive ring support member 43 are together riveted to the first nozzle ring 31 by a portion of the connecting pin 35 at the compressor side. Two flanges for positioning the first nozzle ring 31 and the second nozzle ring 32 are provided at a portion of the connecting pin 35 at the turbine side. Dimensions between the two flanges are made with high precision, and thereby dimensional precision of the gas inflow passage 21 in an axial direction is secured. The drive ring 28 is mounted on the drive ring support member 43, and thereby the drive ring 28 is supported to be rotatable around the rotational axis H. An outer circumferential portion of the support ring 41 is held in an axial direction by the turbine housing 4 and the bearing housing 13, so that the entire variable nozzle unit 25 is fixed to the turbine housing 4 and the bearing housing 13. That is, the outer circumferential portion of the support ring 41 is interposed between the turbine housing 4 and the bearing housing 13 in the axial direction, so that the entire variable nozzle unit 25 is held by the turbine housing 4 and the bearing housing 13.

The drive ring 28 is a member for transmitting a driving force input from the outside to the nozzle vanes 23, and is formed by one member made of, for instance, a metal material. The drive ring 28 has a ring shape that extends on a circumference whose center is the rotational axis H, receives the driving force from the outside, and is rotated around the rotational axis H. Levers 29 are mounted on rotary shafts 23a of the respective nozzle vanes 23, and are arranged on an inner circumference at an inner side of the drive ring 28 at regular intervals. Grooves 28a are formed at an inner circumferential side of the drive ring 28 at position corresponding to the respective levers 29 at regular intervals. One end of each of the levers 29 is meshed with each of the grooves 28a of the drive ring 28, and the other end of each of the levers 29 is fixed to each of the rotary shafts 23a of the nozzle vanes 23. When the driving force from the outside of the turbine 2 is input to the drive ring 28, the drive ring 28 is rotated around the rotational axis H. With the rotation of the drive ring 28, the levers 29 meshed with the grooves 28a are rotated, and the nozzle vanes 23 are rotated via the rotary shafts 23a. One input groove 28b is formed at the inner circumferential side of the drive ring 28, and the input groove 28b is disposed between a set of grooves 28a and 28a. The aforementioned driving force from the outside to the drive ring 28 is input as an external force for the input groove 28b in a circumferential direction.

In this variable nozzle unit 25, a portion which is made up of the first nozzle ring 31, the second nozzle ring 32, the support ring 41, and the connecting pins 35 constitutes a unit main body part 51 that is fixed to the turbine housing 4 and rotatably supports the plurality of nozzle vanes 23. That is, the unit main body part 51 is held on the turbine housing 4, and rotatably supports the plurality of nozzle vanes 23. The drive ring support member 43 constitutes a ring support member that is fixed to the unit main body part 51 and rotatably supports the drive ring 28. A method of fixing the drive ring support member 43 to the unit main body part 51 is not limited to the constitution in which the drive ring support member 43 is together riveted to the first nozzle ring 31 along with the support ring 41, various fixing methods can be adopted.

Figure 3:
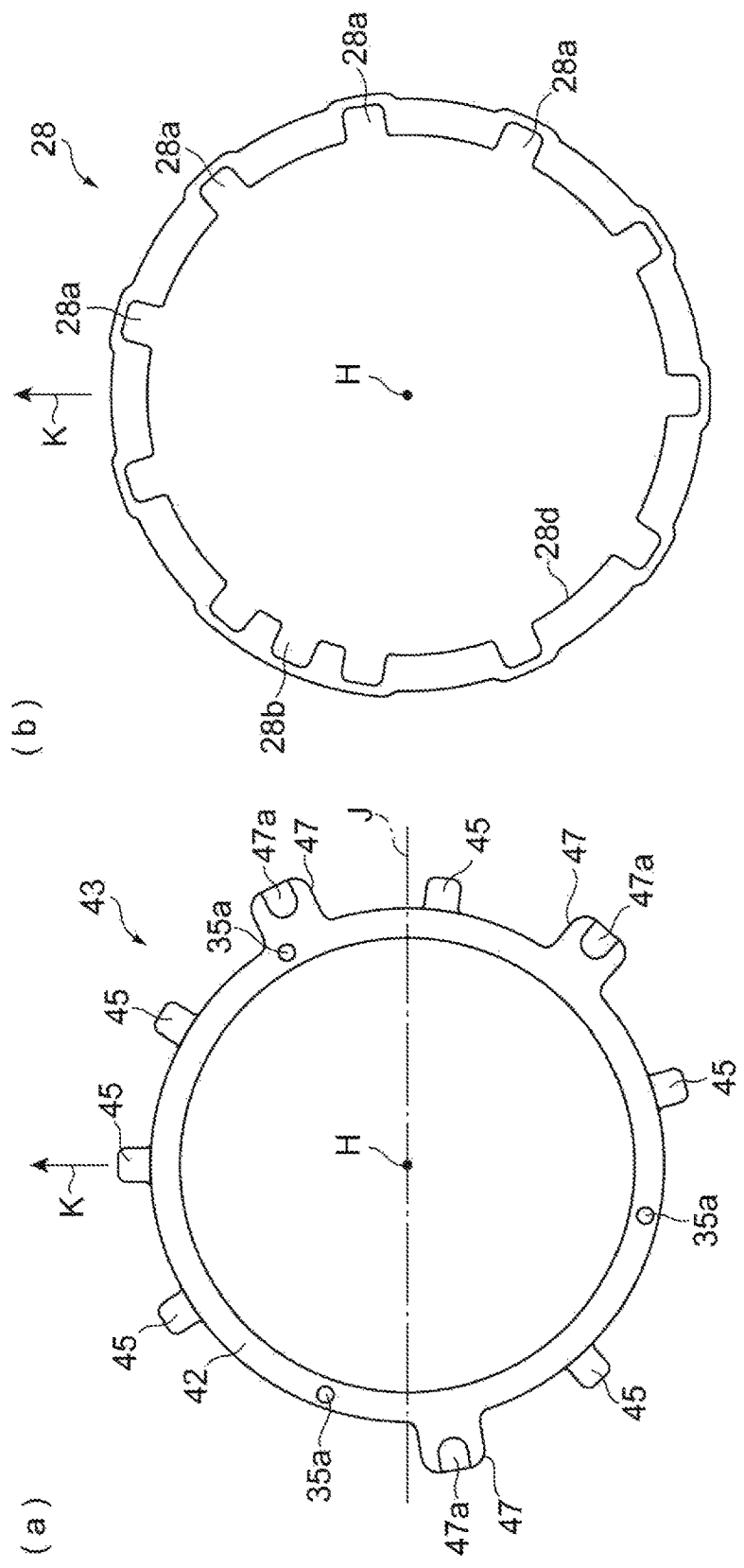
FIG. 3(a) is a top view of a drive ring support member.
FIG. 3(b) is a top view of a drive ring.
Figure 4:
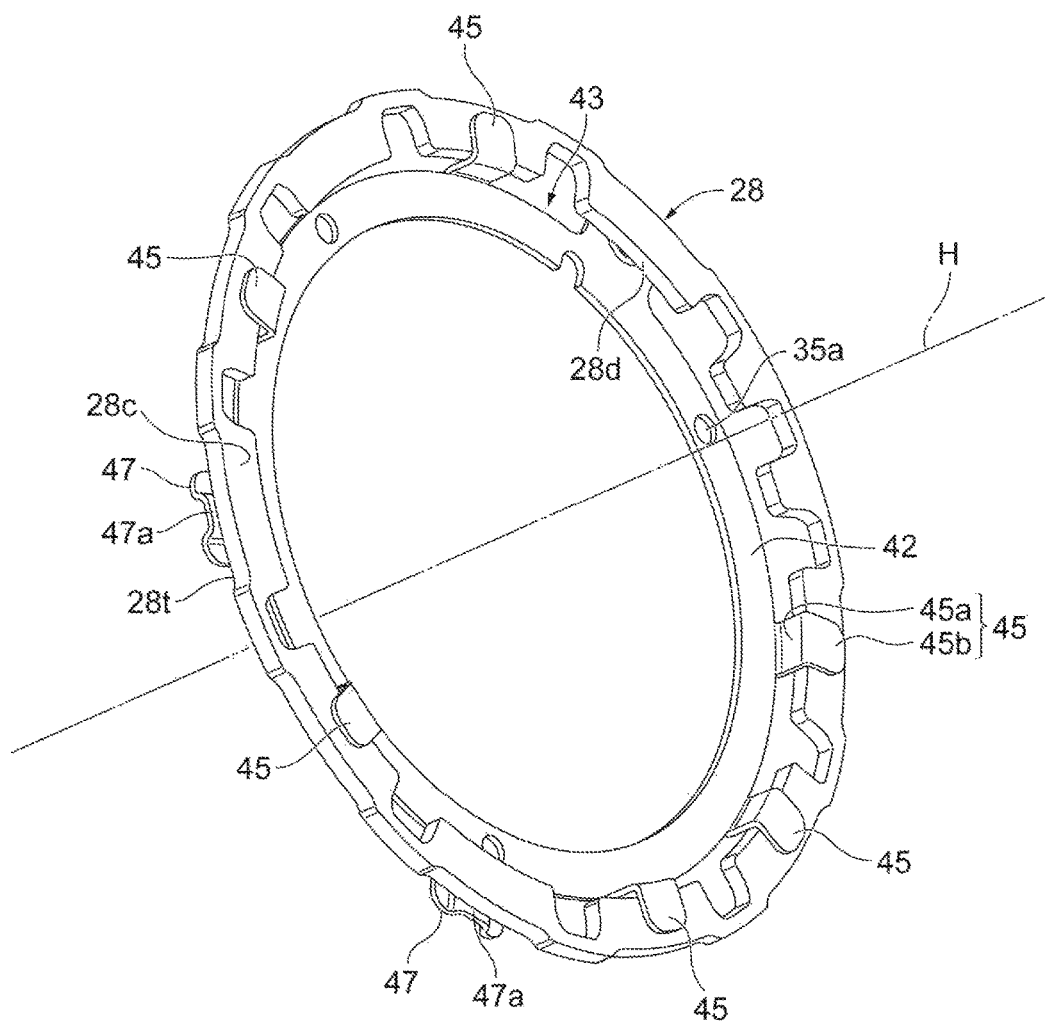
FIG. 4 is a perspective view illustrating a state in which the drive ring is mounted on the drive ring support member.

Subsequently, a constitution of the drive ring support member 43 and an aspect of supporting the drive ring 28 using the drive ring support member 43 will be described with reference to FIGS. 2 to 5. FIG. 3(a) is a top view of the drive ring support member 43 viewed from the compressor 3 side with the line of sight parallel to the rotational axis H. FIG. 3(b) is a top view of the drive ring 28 viewed from the compressor 3 side with the line of sight parallel to the rotational axis H. FIG. 4 is a perspective view illustrating a state in which the drive ring 28 is mounted on the drive ring support member 43. FIG. 5(a) is a sectional view taking a cross section parallel to a radial direction including a hook part 45 in FIG. 4. FIG. 5(b) is a sectional view taking a cross section parallel to a radial direction including a protrusion part 47a in FIG. 4. FIG. 5(c) is a view illustrating the vicinity of the protrusion part 47a when viewed from the outside in a radial direction.

The drive ring support member 43 includes a member main body part 42 having a flat ring shape, a plurality of hook parts 45 that are erected from an outer circumferential portion of the member main body part 42 to the compressor side, and a plurality of turbine side receiving parts (third parts) 47 that extend outward from the outer circumferential portion of the member main body part 42 in a radial direction. The drive ring support member 43 is formed by one member, and is made by, for instance, pressing. A diameter of an outer circumference of the member main body part 42 is slightly smaller than a diameter of an inner circumference of the drive ring. The drive ring support member 43 and the drive ring 28 are members made of, for instance, a metal. The hook parts 45 and the turbine side receiving parts 47 are arranged at positions corresponding to portions at which the grooves 28a of the drive ring 28 and the input groove 28b are not present. The hook parts 45 and the turbine side receiving parts 47 are provided on a circumference whose center is the rotational axis II at positions at which they do not overlap each other by a plural number.

The hook parts 45 are arranged on the circumference whose center is the rotational axis H by a plural number (in the example of the figure, six), and are hooked on an edge of the inner circumferential side of the drive ring 28. Each of the hook parts 45 has a base end side part (a first portion) 45a that extends from an outer circumferential edge of the member main body part 42 in an axial direction, and a tip side part (a second portion) 45b that is bent from the base end side part 45a and extends outward in a radial direction.

Here, as will be described below, each of the hook parts 45 has a function as a radial regulating part that regulates movement of the drive ring 28 in a radial direction in addition to a function of regulating movement of the drive ring 28 in a direction of the rotational axis. When the variable geometry turbocharger 1 is mounted in an internal combustion engine of a vehicle or the like, the drive ring support member 43 and the drive ring 28 are arranged, for instance, in a posture in which a direction of an arrow K illustrated in FIG. 3 is set to be upward and the rotational axis H is set to be horizontal. In this posture, the movement of the drive ring support member 43 is regulated by a dead load of the drive ring 28, and thus the arrangement of the hook parts 45 may be set as follows. That is, some (in the example of the figure, three of six) of the hook parts 45 may be set to be arranged within a range of 180° above the rotational axis H (within a range above a dot-and-chain line J in the figure).

The base end side part 45a of each of the hook parts 45 is located inside the edge of the inner circumferential side of the drive ring 28 in a radial direction, and faces inner circumferential edge faces 28d of the drive ring 28. The base end side parts 45a may be in contact with the inner circumferential edge faces 28d of the drive ring 28. With this constitution, the plurality of base end side part 45a arranged on the circumference function as the radial regulating parts that regulate the movement of the drive ring 28 in a radial direction. A diameter of a virtual circle passing through the base end side parts 45a is slightly smaller than a diameter of a virtual circle passing through the inner circumferential edge faces 28d of the drive ring 28. For this reason, slight play is provided between the drive ring support member 43 and the drive ring 28 in a radial direction.

The tip side parts 45b of the hook parts 45 exceed positions of the inner circumferential edge faces 28d of the drive ring 28 to extend outward in a radial direction, and face end faces 28c at the compressor side. The tip side parts 45b may be in contact with the end faces 28c at the compressor side. With this constitution, the tip side parts 45b function as the compressor side regulating parts that regulate the movement of the drive ring 28 toward the compressor side in the direction of the rotational axis H.

The turbine side receiving parts 47 are arranged on the circumference whose center is the rotational axis H by a plural number (in the example of the figure, three). The turbine side receiving parts 47 exceed the positions of the inner circumferential edge faces 28d of the drive ring 28 to extend outward in a radial direction. Each of the turbine side receiving parts 47 has a protrusion part 47a that is provided at a tip thereof and protrudes to the compressor side. Tip portions of the turbine side receiving parts 47 are bent to be extruded to the compressor side, and thereby the protrusion parts 47a are formed. The protrusion parts 47a face end faces 28t of the drive ring 28 at the turbine side. The protrusion parts 47a may be in contact with the end faces 28t of the drive ring 28 at the turbine side. With this constitution, the turbine side receiving parts 47 function as the turbine side regulating parts that regulate the movement of the drive ring 28 toward the turbine side in the direction of the rotational axis H. A gap between the tip side part 45b and the protrusion part 47a in an axial direction is formed to be slightly wider than a thickness of the drive ring 28. For this reason, slight play is provided between the drive ring support member 43 and the drive ring 28 in an axial direction.

With the above constitution, the drive ring support member 43 supports the drive ring 28 to regulate the movement of the drive ring 28 in a radial direction, to the compressor side, and to the turbine side. The portion at which the movement of the drive ring 28 in a circumferential direction is regulated is not formed at the drive ring support member 43. For this reason, in a state in which the drive ring 28 is supported by the drive ring support member 43, the drive ring 28 can be rotated around the rotational axis H.

The arrangement intervals of the hook parts 45 in a circumferential direction correspond to those of the grooves 28a. That is, when the drive ring 28 is rotated around the direction of the rotational axis H relative to the drive ring support member 43 by a predetermined amount, all the hook parts 45 have circumferential phases matched with a corresponding circumferential phase of any of the grooves 28a (in the example of the figure, six of eleven). The diameter of the virtual circle passing through the tips of the hook parts 45 is slightly smaller than a diameter of a virtual circle passing through deepest portions of the grooves 28a. A width of the tip side part 45b in a circumferential direction is slightly smaller than that of the groove 28a in a circumferential direction. A size of the tip side part 45b of the hook part 45 is slightly smaller than that of the groove 28a. With these constitutions, when the drive ring 28 is mounted on the drive ring support member 43, this can be done as follows. That is, the drive ring 28 can be inserted into the drive ring support member 43 from the compressor side by rotating the drive ring 28 by a predetermined amount such that all the hook parts 45 pass through the grooves 28a. Afterwards, the drive ring 28 is further rotated in a predetermined circumferential phase, and thereby the drive ring 28 is in a state in which it is supported by the drive ring support member 43 as described above.

To easily form the drive ring support member 43 having the member main body part 42, the hook parts 45, and the turbine side receiving parts 47 as described above using one member, the hook parts 45 and the turbine side receiving parts 47 are provided at positions different from each other in a circumferential direction. According to the constitution, for example a metal flat plate is pressed, and thereby the drive ring support member 43 can be relatively easily made of one member.

Subsequently, an operation and effects from the variable geometry turbocharger 1 will be described. In the variable nozzle unit 25 of the variable geometry turbocharger 1, the drive ring 28 is supported by the drive ring support member 43 formed by one member, and the movement of the drive ring 28 in the radial direction, to the compressor side, and to the turbine side is regulated. In this way, the functions of the movement regulation in the radial direction, the movement regulation to the compressor side, and the movement regulation to the turbine side required to support the drive ring 28 are realized by one member. Therefore, a structure of the variable nozzle unit 25 can be simplified, and manufacturability can be improved. Furthermore, manufacturing costs of the variable geometry turbocharger 1 can be reduced.

The present invention can be carried out in various modes that are modified and improved on the basis of knowledge of those skilled in the art starting with the above embodiment. Modifications can be made using technical matters described in the above embodiment. The constitutions of the embodiments may be used by a proper combination thereof. For example, in the embodiment, the example in which the number of hook parts 45 arranged in the drive ring support member 43 is made more than the number of turbine side receiving parts 47 has been described. However, the turbine side receiving parts 47 and the hook parts 45 may have the same number, and it does not matter that the turbine side receiving parts 47 are more than the hook parts 45. Similarly, the example in which some of the hook parts 45 are plurally arranged within the range of 180° above the rotational axis H in the posture of the state mounted in an internal combustion engine of a vehicle or the like has been described. However, it does not matter that the circumferential phases in which the hook parts 45 and the turbine side receiving parts 47 are arranged are arbitrary. For example, a single hook part 45 may be disposed within the range of 180° above the rotational axis H.

REFERENCE SIGNS LIST 1, 101 Variable geometry turbocharger
2 Turbine
3 Compressor
4 Turbine housing
6 Turbine impeller
7 Compressor impeller
14 Rotary shaft
16 Scroll flow passage
21 Gas inflow passage
23 Nozzle vane
25 Variable nozzle unit
28 Drive ring
28c End face at compressor side
28t End face at turbine side
43 Drive ring support member (ring support member)
45 Hook part
45a Base end side part (radial regulating part)
45b Tip side part (compressor side regulating part)
47 Turbine side receiving part (turbine side regulating part)
47a Protrusion part
51 Unit main body part
H Rotational axis

The invention claimed is:

1. A variable geometry turbocharger comprising:
a turbine having a turbine impeller, a turbine housing configured to form a scroll flow passage disposed around the turbine impeller, and a variable nozzle unit including a plurality of movable nozzle vanes disposed around the turbine impeller in a gas inflow passage from the scroll flow passage to the turbine impeller; and a compressor connected to the turbine impeller via a rotary shaft and having a compressor impeller rotating around the same rotational axis as the turbine impeller, wherein the variable nozzle unit has a unit main body part that is held on the turbine housing and rotatably supports the plurality of nozzle vanes, a drive ring that is rotated around the rotational axis relative to the unit main body part and transmits a driving force to the plurality of nozzle vanes, and a ring support member that is fixed to the unit main body part and rotatably supports the drive ring, the ring support member is formed by one member, and has radial regulating parts that regulate movement of the drive ring in a radial direction, compressor side regulating parts that regulate movement of the drive ring to the compressor side in a direction of the rotational axis, and turbine side regulating parts that regulate movement of the drive ring to the turbine side in the direction of the rotational axis, the ring support member includes a plurality of hook parts that are arranged on a circumference whose center is the rotational axis and are engaged with an edge of an inner circumferential side of the drive ring, each of the hook parts has the radial regulating part located inside in a radial direction relative to the edge of the inner circumferential side of the drive ring, the compressor side regulating part that extends outward from the radial regulating part in the radial direction and faces an end face of the drive ring at the compressor side, and the hook parts and the turbine side regulating parts are provided at positions different from each other in a circumferential direction.

2. The variable geometry turbocharger according to claim 1, wherein the turbine side regulating parts have a plurality of protrusion parts that are arranged on the circumference whose center is the rotational axis and protrude to the compressor side to face an end face of the drive ring at the turbine side.

* * * * *